United States Patent
Fix et al.

(10) Patent No.: US 9,810,765 B2
(45) Date of Patent: *Nov. 7, 2017

(54) FEMTOCELL CALIBRATION FOR TIMING BASED LOCATING SYSTEMS

(71) Applicant: AT&T Mobility II LLC, Atlanta, GA (US)

(72) Inventors: Jeremy Fix, Acworth, GA (US); Brandon Bowers Hilliard, Canton, GA (US); Sheldon Meredith, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 254 days.

This patent is subject to a terminal disclaimer.

(21) Appl. No.: 14/601,800

(22) Filed: Jan. 21, 2015

(65) Prior Publication Data

US 2015/0133156 A1    May 14, 2015

Related U.S. Application Data

(63) Continuation of application No. 13/305,267, filed on Nov. 28, 2011, now Pat. No. 8,970,432.

(51) Int. Cl.
  *G01S 1/08*    (2006.01)
  *G01S 3/02*    (2006.01)
  (Continued)

(52) U.S. Cl.
  CPC ............... *G01S 5/06* (2013.01); *G01S 5/021* (2013.01); *G01S 5/10* (2013.01)

(58) Field of Classification Search
  CPC ............. G01S 5/06; G01S 3/48; H04W 64/00
  (Continued)

(56) References Cited

U.S. PATENT DOCUMENTS 4,718,081 A    1/1988    Brenig
5,515,062 A    5/1996    Maine et al.
(Continued)

FOREIGN PATENT DOCUMENTS

EP    0856746 A2    8/1998
EP    1145526    10/2001
(Continued)

OTHER PUBLICATIONS

Notice of Allowance dated Aug. 27, 2015 for U.S. Appl. No. 14/521,431, 39 Pages.
(Continued)

*Primary Examiner* — Dao Phan
(74) *Attorney, Agent, or Firm* — Amin, Turocy & Watson, LLP

(57) ABSTRACT

A femtocell calibration solution is provided that uses the known location of the femtocell to calibrate timing based locating systems. The calculated time differences of different signals sent between macrocells and a mobile device can be used to solve for a reference time difference that accounts for the timing differences of the unsynchronized macrocells. The reference time difference can then be used to solve for the location of another mobile device if the calculated time differences between that mobile device and the macrocells are known. The solution can include taking many measurements of the calculated time difference at the first mobile device in order to average them to get a more accurate reference time difference. The solution can further include ceasing measurements at the first mobile device when the mobile device is no longer within range of the femtocell.

20 Claims, 10 Drawing Sheets

(51) Int. Cl.
  *G01S 5/04* (2006.01)
  *G01S 5/06* (2006.01)
  *G01S 5/02* (2010.01)
  *G01S 5/10* (2006.01)

(58) Field of Classification Search
  USPC .......... 342/357.25, 386, 387, 442, 444, 457;
                                        455/456.2, 456.6
  See application file for complete search history.

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,402,356 B2 | 3/2013 | Martinez et al. |
| 8,417,264 B1 | 4/2013 | Whitney et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,008,684 B2 | 4/2015 | Tipton et al. |
| 9,008,698 B2 | 4/2015 | Meredith et al. |
| 9,232,399 B2 | 1/2016 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp |
| 2003/0040323 A1 | 2/2003 | Pihl et al. |
| 2003/0092448 A1 | 5/2003 | Forstrom et al. |

(56) References Cited

U.S. PATENT DOCUMENTS

| | | |
|---|---|---|
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0163632 A1 | 7/2010 | Tseng et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |

(56) References Cited

U.S. PATENT DOCUMENTS

| | | |
|---|---|---|
| 2011/0210849 A1 | 9/2011 | Howard et al. |
| 2011/0244879 A1 | 10/2011 | Siomina |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0221232 A1 | 8/2012 | Shang et al. |
| 2012/0253656 A1 | 10/2012 | Brandt |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0226451 A1 | 8/2013 | O'Neill et al. |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2015/0011249 A1 | 1/2015 | Siliski et al. |

FOREIGN PATENT DOCUMENTS

| | | |
|---|---|---|
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action mailed Nov. 30, 2015 for U.S. Appl. No. 13/447,072, 45 pages.
Office Action mailed Dec. 18, 2015 for U.S. Appl. No. 14/548,901, 35 pages.
Office Action mailed Dec. 31, 2015 for U.S. Appl. No. 14/952,609, 32 pages.
Office Action mailed Dec. 1, 2015 for U.S. Appl. No. 13/526,988, 43 pages.
Office Action dated Jan. 11, 2016 for U.S. Appl. No. 13/175,199, 29 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.

(56) References Cited

OTHER PUBLICATIONS

Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://suppor.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00(c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN lu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance mailed Jan. 21, 2015 for U.S. Appl. No. 13/495,391, 98 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Office Action dated Feb. 13, 2015 for U.S. Appl. No. 13/188,136, 44 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Office Action dated Apr. 16, 2015 for U.S. Appl. No. 14/521,431, 82 Pages.
Notice of Allowance dated Mar. 19, 2015 for U.S. Appl. No. 13/494,959, 41 Pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action mailed Mar. 11, 2016 for U.S. Appl. No. 14/743,076, 86 pages.
Notice of Allowance mailed Mar. 16, 2016 for U.S. Appl. No. 14/520,287, 23 pages.
Office Action mailed Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Jun. 10, 2016 for U.S. Appl. No. 14/548,901, 33 pages.
Office Action dated Jun. 22, 2016 for U.S. Appl. No. 14/970,533, 84 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.

(56) References Cited

OTHER PUBLICATIONS

Office Action dated Aug. 25, 2016 for U.S. Appl. No. 13/447,072, 38 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated May 20, 2015 for U.S. Appl. No. 13/526,988, 52 pages.
Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al., Location Privacy Enforcement in a Location-Based Services Platform, IEEE, 2009, 978-1-4244-2309-5/09/$25.00 © 2009 IEEE. Retrieved on Jul. 29, 2015, 5 pages.
Philips, Jr. et al., Information Sharing and Security in Dynamic Coalitions, ACM, 2002. Retrieved on Jul. 29, 2015, 10 pages.
Moniruzzaman, et al., "A Study of Privacy Policy Enforcement in Access Control Models", Proceedings of 13th International Conference on Computer and Information Technology (ICCIT 2010), © 2010 IEEE. Retrieved on Jul. 29, 2015, 6 pages.
Office Action dated Jul. 22, 2015 for U.S. Appl. No. 13/188,136, 31 Pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 14, 2015 for U.S. Appl. No. 13/557,425, 32 Pages.
Office Action dated Sep. 18, 2015 for U.S. Appl. No. 14/641,247, 69 Pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/O.
Represent. (2011). In the american heritage dictionary of the english language. Retrieved on May 9, 2014 from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Final Office Action dated Apr. 3, 2014 for U.S. Appl. No. 13/188,295, 37 pages.
Office Action dated Jun. 18, 2014 for U.S. Appl. No. 13/305,276, 26 Pages.

Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 0(Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.

(56) References Cited

OTHER PUBLICATIONS directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future . . . 15 pages.
Intelligent Transportation System. Published online http://en.wikipedia.org/wiki/Intelligent_transportation_system. Retrieved on Aug. 15, 2011, 7 pages.
Koukoumidis, et al., "SignalGuru: Leveraging Mobile Phones for Collaborative Traffic Signal Schedule Advisory." MobiSys'11, Jun. 28-Jul. 1, 2011, Bethesda, Maryland, USA, Copyright 2011 ACM 978-1-4503-0643-0/11/06. Retrieved on Nov. 19, 2011, 14 pages.
Bitcarrier Technology. Published online at http://www.bitcarrier.com/technology. Retrieved on Aug. 15, 2011, 1 page.
Hao, et al., "Estimating Vehicle Position in a Queue at Signalized Intersections Using Simple Travel Times from Mobile Sensors." Retrieved on Nov. 19, 2011, 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No.13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Office Action dated Sep. 30, 2016 for U.S. Appl. No. 14/957,525, 72 pages.
Notice of Allowance mailed Oct. 7, 2016 for U.S. Appl. No. 14/548,901, 45 pages.
Office Action dated Oct. 12, 2016 for U.S. Appl. No. 14/877,915, 34 pages.
Notice of Allowance mailed Nov. 16, 2016 for U.S. Appl. No. 15/186,410, 80 pages.
Office Action dated Dec. 28, 2016 for U.S. Appl. No. 13/447,072, 34 pages.
Office Action dated Feb. 27, 2017 for U.S. Appl. No. 15/132,220, 91 pages.
Office Action dated Jan. 26, 2017 for U.S. Appl. No. 14/877,915, 20 pages.
Office Action dated Feb. 14, 2017 for U.S. Appl. No. 14/641,242, 120 pages.
Office Action dated Feb. 15, 2017 for U.S. Appl. No. 15/191,877, 104 pages.
Notice of Allowance dated Apr. 10, 2017 for U.S. Appl. No. 14/676,066, 33 pages.
Office Action dated Jun. 12, 2017 for U.S. Appl. No. 15/132,220, 25 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Office Action dated Jun. 19, 2017 for U.S. Appl. No. 13/447,072, 47 pages.
Office Action dated Jul. 5, 2017 for U.S. Appl. No. 15/191,877, 32 pages.
Office Action dated Jul. 25, 2017 for U.S. Appl. No. 15/422,147, 86 pages.
Office Action dated Aug. 24, 2017 for U.S. Appl. No. 14/881,335, 125 pages.
Notice of Allowance dated Aug. 16, 2017 for U.S. Appl. No. 14/877,915, 63 pages.

FEMTOCELL CALIBRATION FOR TIMING BASED LOCATING SYSTEMS

CROSS-REFERENCE TO RELATED APPLICATION

This application is a continuation of, and claims priority to, U.S. patent application Ser. No. 13/305,267 (now U.S. Pat. No. 8,970,432), filed Nov. 28, 2011, entitled "FEMTOCELL CALIBRATION FOR TIMING BASED LOCATING SYSTEMS", the disclosure of which is incorporated herein by reference in its entirety.

TECHNICAL FIELD

The subject disclosure relates to wireless communications, and, more particularly, to calibrating timing based locating systems using femtocells in a wireless environment.

BACKGROUND

Accurately locating mobile devices that are active on a network is beneficial not just to mobile device users, but also to network operators. If the network operators know the precise locations of the mobile devices, many services can be offered that would not otherwise be possible. Such services can include: dynamic provisioning of coupons as mobile device users pass in front of retail stores; marketing; analyzing traffic flow and routes; and analyzing network performance issues. Network performance issues can include poor coverage areas and dropped calls. Knowing the precise location of where network performance issues are occurring can be beneficial in troubleshooting and solving the issues.

BRIEF DESCRIPTION OF THE DRAWINGS

Various non-limiting embodiments are further described with reference to the accompanying drawings in which.

DETAILED DESCRIPTION

Figure 1:
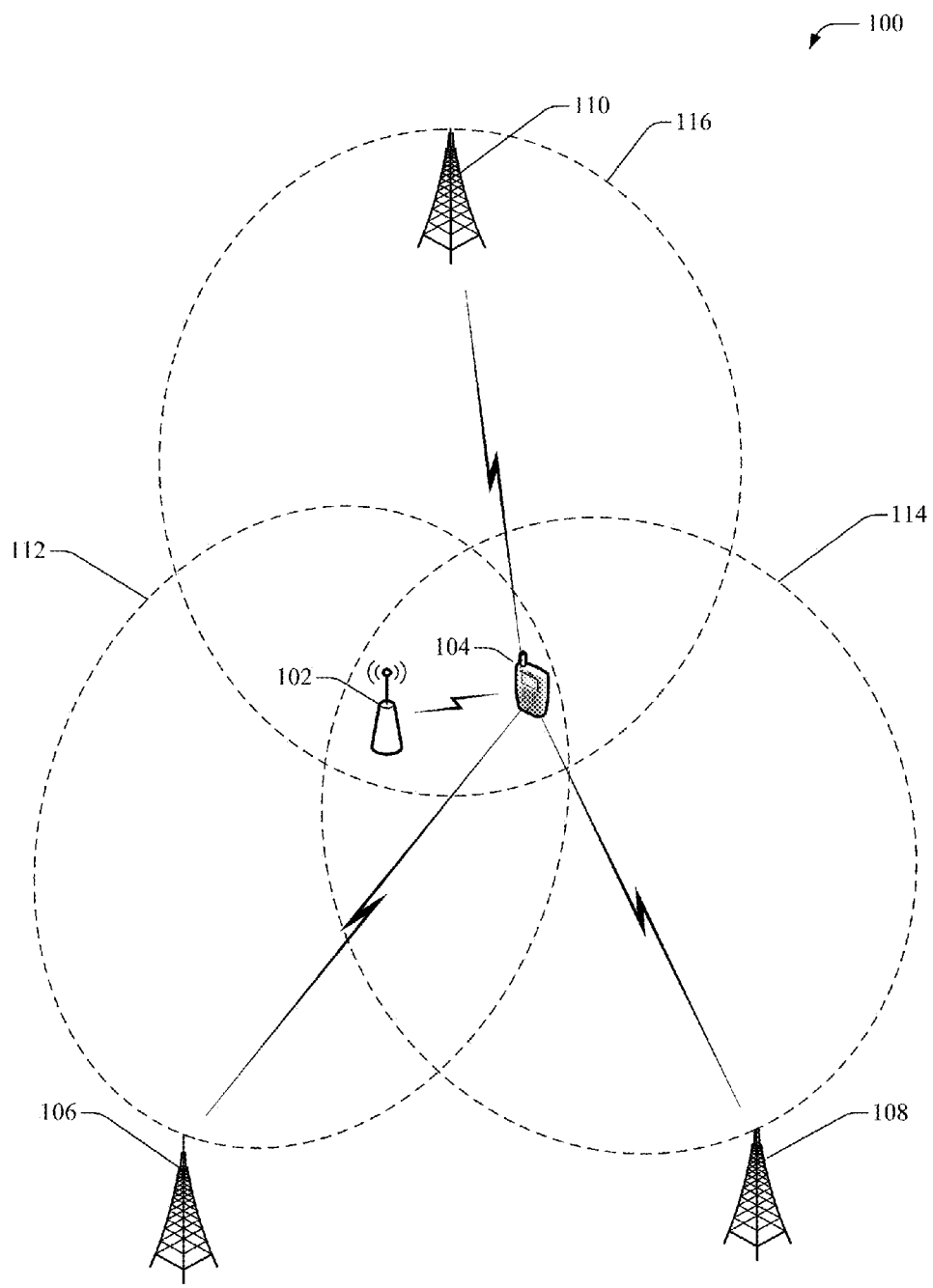
FIG. 1 illustrates an example, non-limiting embodiment of a system that can facilitate measuring calculated time differences at a known location in accordance with the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" and/or "exemplary" is used herein to mean serving as an example, instance, or illustration. Any aspect or design described herein as "example" and/or "exemplary" is not necessarily construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

In various non-limiting embodiments, systems and methods are provided to calibrate timing measurements from macrocells to locate mobile devices more accurately. In an example embodiment, a method comprises identifying a first mobile device in range of a femtocell access point and obtaining location information from the femtocell access point. The method can also include receiving calculated time differences of signals between the first mobile device and macrocells in range of the first mobile device and calculating a reference time difference for the macrocells using the location information and the calculated time differences. The method can also include receiving calculated time differences of signals received at a second mobile device and solving for a location of the second mobile device in response to the calculated time differences of signals and the reference time difference of the macrocells.

In another example embodiment, a system can comprise an identification component configured to determine that a first mobile device is within range of a femtocell access point. The system can also comprise a collection component that can be configured to obtain location information from the femtocell access point and the calculated time differences between the first mobile device and macrocells in range of the first mobile device. The system can also comprise a calibration component configured to calculate a reference time difference for the macrocells using the calculated time differences and the location information. The collection component can also be configured to collect calculated time differences of signals between a second mobile device and the macrocells, and a location component can be configured to determine a location of the second mobile device in response to the calculated time differences of signals for the second mobile device and the reference time differences.

The following description and the annexed drawings set forth certain illustrative aspects of the specification. These aspects are indicative, however, of but a few of the various ways in which the principles of the specification may be employed. Other novel features of the specification will become apparent from the following detailed description of the specification when considered in conjunction with the drawings.

The systems and methods disclosed herein can implement a femtocell calibration solution that uses the known location of the femtocell to calibrate timing based locating systems. The calculated time differences of different signals sent between macrocells and a mobile device can be used to solve for a reference time difference that accounts for the timing differences of the unsynchronized macrocells. The reference time difference can then be used to solve for the location of another mobile device if the calculated time differences between that mobile device and the macrocells are known.

The solution can include taking many measurements of the calculated time difference at the first mobile device in order to average them to get a more accurate reference time difference. The solution can further include ceasing measurements at the first mobile device when the mobile device is no longer within range of the femtocell.

Aspects or features of the subject innovation can be exploited in substantially any wireless communication technology; e.g., Universal Mobile Telecommunications System (UMTS), Code division multiple access (CDMA), Wi-Fi, Worldwide Interoperability for Microwave Access (Wi-MAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects of the subject innovation can be exploited in legacy telecommunication technologies.

Turning now to FIG. 1, there is illustrated an example, non-limiting system 100 that can facilitate measuring calculated time differences at a known location in accordance with the subject disclosure. Included in system 100 is a femtocell access point 102 that can be configured to provide a known location. Femtocell access point 102 can also be configured to detect when mobile device 104 is in range of the femtocell access point 102. Macrocells 106, 108, and 110 can have overlapping coverage areas 112, 114, and 116. Mobile device 104, which can be located in an area that is covered by macrocells 106, 108, and 110, can send and receive communication signals from each of the three macrocells.

It is to be appreciated that while FIG. 1 shows mobile device 104 within range of three macrocells, any number of macrocells is possible depending on the physical location. In some geographic locations, the number of macrocells could be as high as 10-15. Additionally, it is also to be appreciated that the reference to "macrocells" as used herein is an example of a cellular base station. A person of ordinary skill in the art would appreciate that any suitable cellular base station with a range of transmitting powers, including, but not limited to microcells and picocells could be employed as well.

Femtocell access point 102 can be configured to detect when mobile device 104 is within range of the femtocell access point 102. Femtocells can have a limited range, perhaps approximately 10-12 m in accordance with an example embodiment. Femtocell access point 102 can determine that mobile device 104 is near when it can transmit to and receive a signal from mobile device 104.

Macrocells 106, 108, and 110, can be configured to send out regular signals that can be received by mobile devices in range of macrocells. The signals can be received and processed by the mobile devices independent of a call. In this way, the network based locating system can operate using network overhead resources that can be cheaper and less resource intensive than communications sent over an application layer datalink.

The signals can contain code that can identify the macrocell that sent the signal. Each macrocell can have a unique signature, so that the signal can be positively identified as belonging to a specific macrocell. The mobile device 104 can analyze the signals when they are received, and compare the times of receipt. When signals arrive at different times that can indicate that the signals had different distances to travel, and thus the relative distances of the macrocells can be determined. These time differences are the calculated time differences and there can be an calculated time difference for each macrocell within range of mobile device 104.

In the exemplary system 100 shown in FIG. 1, there can be three calculated time differences for signals sent between macrocells 106, 108, 110, and mobile device 104. Mobile device 104 can report back the calculated time differences in a Radio Resource Control (RRC) measurement report that includes the primary scrambling code of the macrocell, strength of the signal, and the timing measurement. Since macrocells 106, 108, and 110 are unsynchronized however, the calculated time differences, if used in multilateration or triangulation to locate mobile device 104, would yield a result that would be accurate to between +/−200-500 m. However, using the known location of the femtocell access point 102, the calculated time differences can be calibrated (See FIG. 2), to much more accurately locate a mobile device (See FIGS. 3 and 4).

Figure 2:
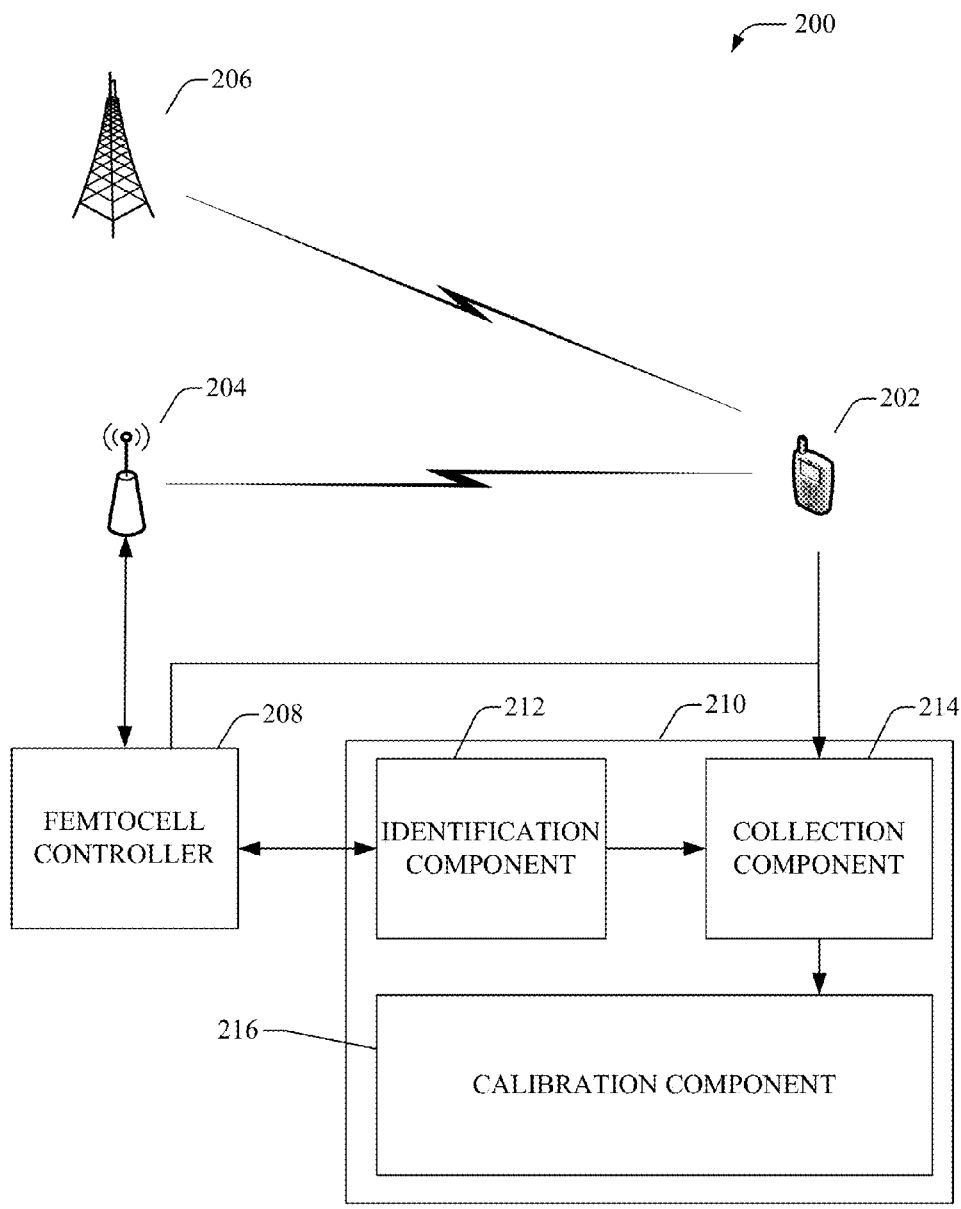
FIG. 2 illustrates an example, non-limiting embodiment of a system that can calibrate timing based location solutions and create a reference time difference in accordance with the subject disclosure.

Turning now to FIG. 2, an example, non-limiting embodiment of a system that can calibrate timing based location solutions and create a reference time difference is shown. Included in system 200 is a mobile device 202 that can be provided to receive signals from macrocell 206 and measure the calculated time difference between macrocell 206 and mobile device 202. Femtocell access point 204 can be provided to provide a known location of the mobile device 202 to core network 210. Communications between the femtocell access point 204 and the core network 210 can be facilitated by a femtocell controller 208. Within the core network 210 can be an identification component 212 configured to determine when mobile device 202 is within range of the femtocell access point 204. A collection component 214 can also be provided to collect the location information from the femtocell access point 204, and the calculated time differences from the mobile device 202. A calibration component 216 can be provided to calculate a reference time difference for the macrocell 206 in using the location information and the calculated time differences.

It is to be appreciated that while FIG. 2 shows one macrocell, any number of macrocells is possible. Indeed, collection component 214 can receive from mobile device 202 as many as 10-15 calculated time differences corresponding to as many discrete macrocells.

Femtocell access point 204 can communicate with the femtocell controller 208 over an Iuh interface on a broadband network. The femtocell controller 208 can then forward information to the core network 210 directly.

Identification component 212 can be configured to determine that the mobile device 202 is within range of the femtocell access point 204. Since femtocell access point 204 may have a limited range, perhaps 10-12 m, femtocell access point 204 can receive and transmit signals to and from the mobile device 202 within a defined range around the femtocell access point 204. Femtocell access point 204 can forward a notification that mobile device 202 is present to the core network 210 via the femtocell controller 208. Identification component 212 can receive the notification that mobile device 202 is within range of the femtocell access point 204, and upon receipt of that notification, collection component 214 can begin collecting the calculated time differences from mobile device 202.

The identification component 212 can also receive from the femtocell access point 204 information that identifies the mobile device, such as the IMSI and MSISDN numbers associated with the mobile device, as well as other identifying information.

Collection component 214 can be configured to collect the location information that corresponds to the femtocell access point 204. In one embodiment, the location information can be provided by the femtocell access point 204 via the femtocell controller 208 over the Iuh interface. In this embodiment, the location information can be obtained by a GPS receiver on the femtocell access point 204. The GPS receiver can continuously provide location information, or can provide new location information if the location of the femtocell access point changes.

In another embodiment, the collection component 214 can collect the location information corresponding to the femtocell access point 204 from a known location of the femtocell access point 204 that is in a data store in the core network 210. To collect location information corresponding to the correct femtocell access point, identification component can receive information identifying the femtocell access point 204 via the femtocell controller 208, and use that information to retrieve the correct location of the femtocell access point 204.

Collection component 214 can obtain the calculated time differences from mobile device 202 in the form of an RRC measurement report. The RRC measurement report can include the primary scrambling code of the macrocell, strength of the signal, and the timing measurement. The primary scrambling code can identify the macrocell. Upon determining the identity of macrocell 206, collection component 214 can also obtain the location of macrocell 206 from a data store in the core network.

In one embodiment, collection component 214 can retrieve the RRC measurement report from mobile device 202 via a macrocell, using network overhead resources. In an alternative embodiment, collection component 214 can retrieve the RRC measurement report from mobile device 202 through the Iuh interface on the femtocell access point 204 and via the femtocell controller 208.

Once the location information for the femtocell access point 204 and the macrocells (of which macrocell 206 can be one of many), and the calculated time differences as measured by mobile device 202 have been received by collection component 214, calibration component 216 can calculate a reference time difference used to calibrate the macrocells.

The reference time differences that calibration component 216 can be configured to calculate are a measure of the relative timing differences that different macrocells have with respect to a baseline time. The reference time differences can be used to compensate for the synchronicities inherent in UMTS and Wideband Code Division Multiple Access (WCDMA) networks so that network based locating systems utilizing calculated time differences will yield more accurate results.

With the known locations of mobile device 202 (e.g., accurate to within the +/−10-12 m range of the femtocell access point 204) and the macrocells, the calibration component 216 can determine the distance between the macrocells and the mobile device. Since signals between the macrocells and mobile device 202 travel at a constant speed c, the expected time it takes for a signal from each macrocell to arrive at mobile device 202 can be determined. Calibration component 216 can then use the expected time to determine the deviation of the signals from a baseline. This deviation is the reference time difference which can compensate for the asynchronous signals from the macrocells. The reference time differences can then be used to accurately locate another mobile device, shown in more detail in FIGS. 3 and 4.

In an embodiment, collection component 214 can be configured to obtain multiple calculated time differences for the same macrocells over a period of time. Collection component 214 can obtain many calculated time differences between each macrocell and the mobile device 202 for a defined period of time, or continuously. Since the mobile device 202 can move around within the range of the femtocell access point 204, averaging the calculated time differences for each macrocell will obtain a more accurate reference time difference, one that corresponds closer to the actual location of the femtocell access point 204.

The collection component 214 can also collect information that identifies the time at which calculated time differences were obtained, as well as the time at which location information for the femtocell access point 204 was collected. Femtocell access points 204 can be moved, and to calculate reference time differences, the location of the femtocell access point 204 should correspond to calculated time differences measured at that location. Time stamps on the RRC measurement reports and the location information from the femtocell access point ensure that the RRC measurement reports correspond to the location at which the measurement reports were measured.

The identification component 212 can also receive an indication from the femtocell access point 204 via femtocell controller 208 when mobile device 202 is no longer within communication range of femtocell access point 204. Upon receiving this indication, identification component 212 can issue a notification to collection component 214 to stop retrieving the RRC measurement reports from the mobile device 202. When mobile device 202 is outside the range of the femtocell access point 204 inaccurate reference time differences will be obtained.

Figure 3:
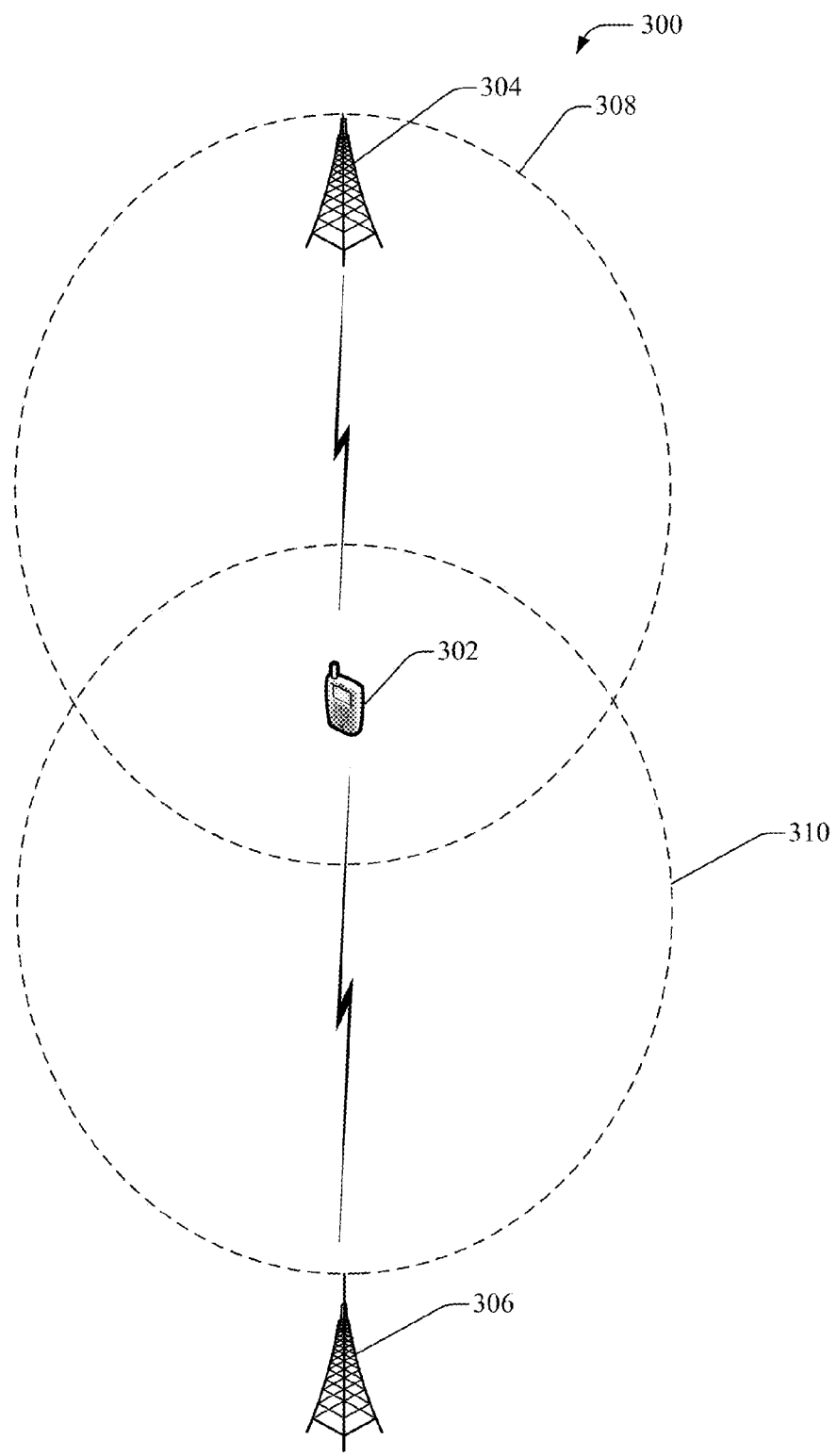
FIG. 3 illustrates an example, non-limiting embodiment of a system that can measure calculated time differences at a mobile device in accordance with the subject disclosure.

Turning now to FIG. 3, an example, non-limiting embodiment of a system 300 that can measure calculated time differences at a mobile device is shown. Mobile device 302 can be provided to measure calculated time differences from macrocells 304 and 306. Macrocells 304 and 306 can have overlapping ranges 308 and 310 respectively. Mobile device 302 can measure the calculated time differences between mobile device 302 and whichever macrocell ranges mobile device 302 is located in.

It is to be appreciated that while FIG. 3 shows mobile device 302 within range of two macrocells, any number of macrocells is possible depending on the physical location. In urban, or semi urban areas, the number of macrocells could be as high as 10-15.

Mobile device 302 can be located outside the range of a femtocell access point. Mobile device 302 can have formerly been within range of a femtocell access point, when reference time differences for macrocells 304 and 306 were determined, or mobile device 302 might have never been within range of a femtocell access point, and the reference time differences may have been calculated using calculated time differences from a different mobile device.

Macrocells 304 and 306 can be configured to send out regular signals that can be received by mobile devices in range of macrocells. The signals can be received and processed by the mobile devices independent of a call. In this way, the network based locating system can operate using network overhead resources that can be cheaper and less resource intensive than communications sent over an application layer data link.

The signals can contain code that can identify the macrocell that sent the signal. Each macrocell can have a unique signature, so that the signal can be positively identified as belonging to a particular macrocell. The mobile device 302 can analyze the signals when received, and compare the times of receipt. When signals arrive at different times that can indicate that the signals had different distances to travel, and thus the relative distances of the macrocells can be determined. These time differences are the calculated time differences and there can be an calculated time difference for each macrocell within range of mobile device 302.

Figure 4:
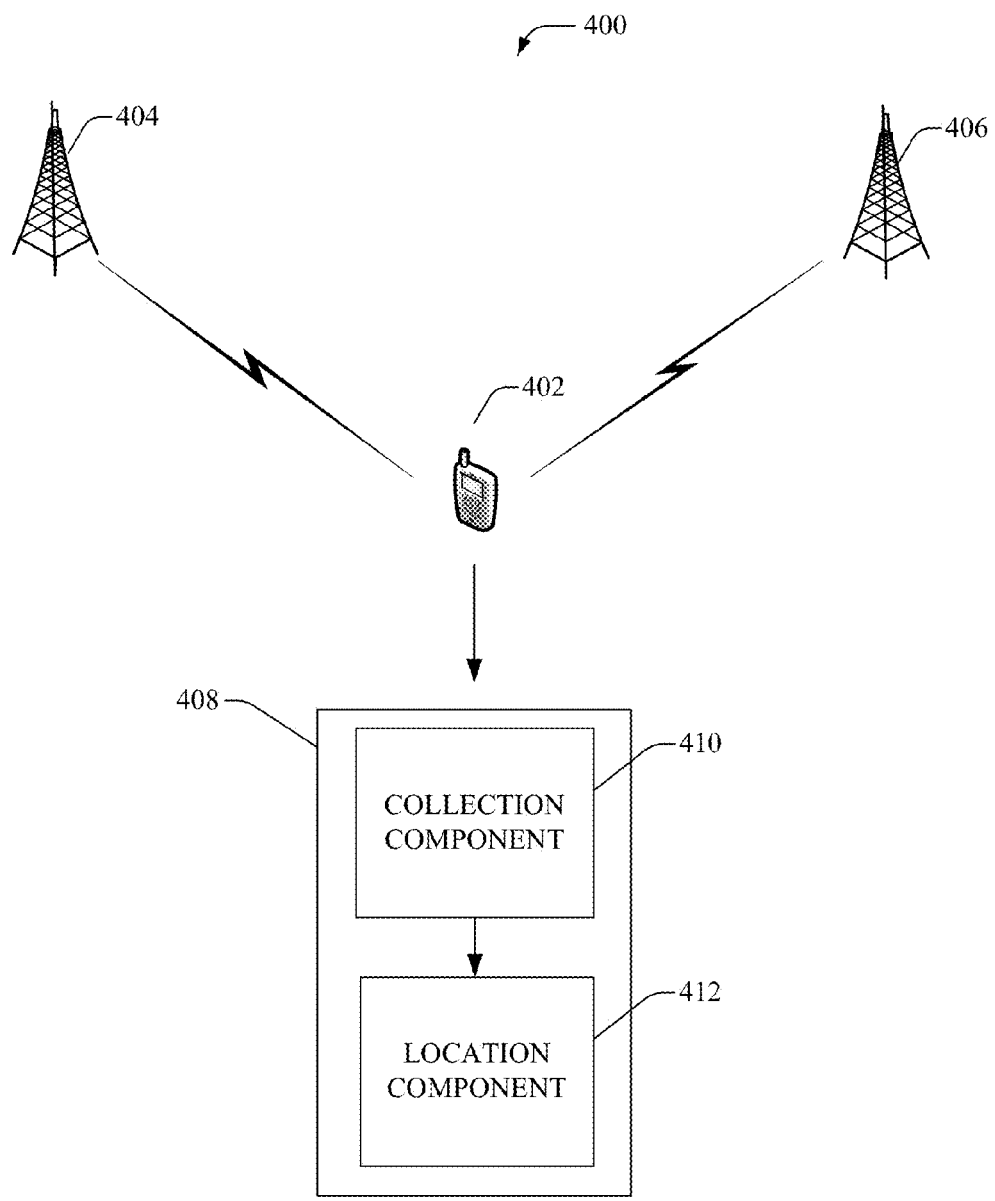
FIG. 4 illustrates an example, non-limiting embodiment of a system that can locate a mobile device in accordance with the subject disclosure.

Turning now to FIG. 4, an example, non-limiting embodiment of a system 400 that can locate a mobile device is shown. A mobile device 402 that has determined calculated time differences from macrocells 404 and 406 can forward the calculated time differences to core network 408. Collection component 410 can receive the calculated time differences and the locations of the macrocells 404 and 406, and can forward the information to location component 412. Location component 412 can use the information collected as well as the reference time differences that correspond to the macrocells to determine the location of mobile device 402.

Collection component 410 can obtain the calculated time differences from mobile device 402 in the form of an RRC measurement report. The RRC measurement report can include the primary scrambling code of the macrocell, strength of the signal, and the timing measurement. The primary scrambling code can identify the macrocell. Upon determining the identity of macrocells 404 and 406, collection component 410 can obtain the location of macrocells 404 and 406 from a data store in the core network. Collection component 410 can retrieve the RRC measurement report from mobile device 402 via one of the macrocells, using network overhead resources.

The reference time differences can show the relative signal delay for each of the macrocells. Subtracting the reference time differences from the calculated time differences can yield actual time differences for signals sent between the macrocells and the mobile device 402. With the actual time difference and the known locations of macrocells 404 and 406, it can be possible to use multilateration or hyperbolic positioning which uses time difference on arrival (TDOA) equations to solve for the location of mobile device 402.

Location component 412 can determine the position of any mobile device to within a defined range, perhaps +/−10-12 m, which corresponds to the accuracy in determining the position of the mobile device that was used to calibrate the macrocells—the range of the femtocell access point can be, for example, +/−10-12 m, and the mobile device can be anywhere in that area. During the calibration phase, as more calculated time differences are measured over time and averaged, the position of the mobile device can move nearer the center of the femtocell access point, and the reference time differences can become more accurate, leading to greater than +/−10-12 m accuracy.

Figure 5:
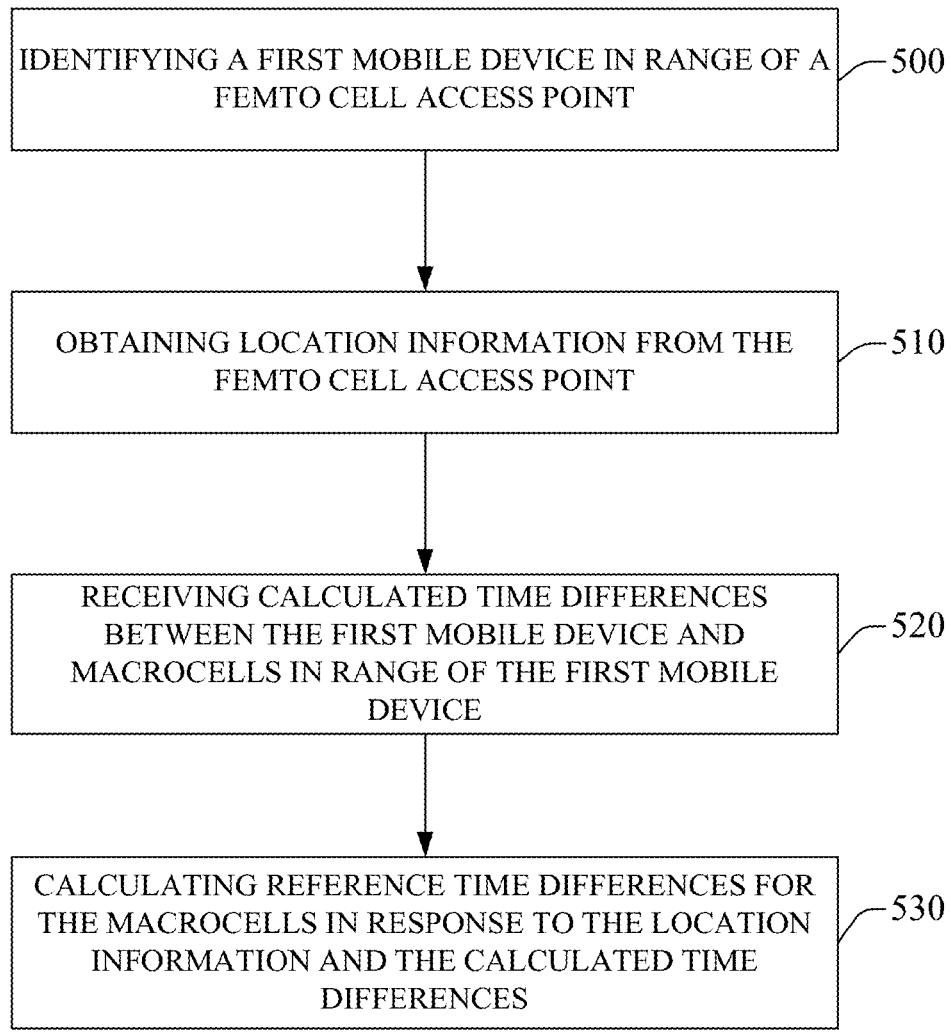
FIG. 5 illustrates an example, non-limiting method for calibrating timing based location systems in accordance with the subject disclosure.
Figure 6:
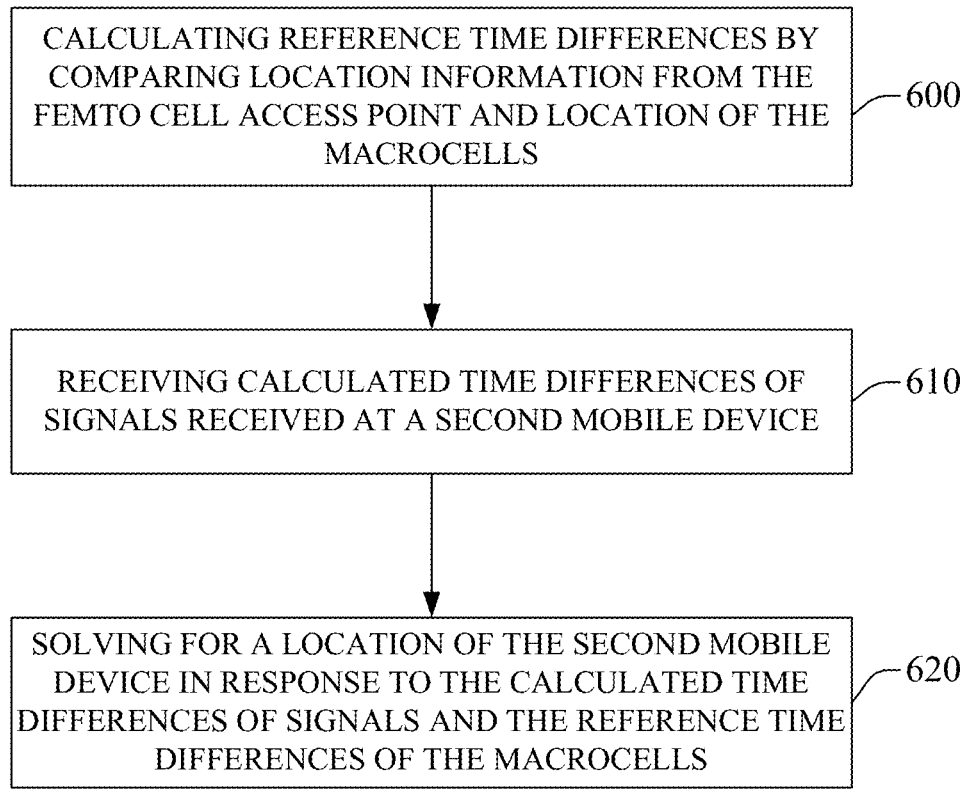
FIG. 6 illustrates an example, non-limiting method for locating mobile devices in accordance with the subject disclosure.

FIGS. 5 and 6 illustrate methods and/or flow diagrams in accordance with the disclosed subject matter. For simplicity of explanation, the methods are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 5, illustrated is an example, non-limiting process for calibrating timing based location systems in accordance with the subject disclosure. At 500, a mobile device in range of a femtocell access point can be identified. The femtocell can detect when a mobile device is in range by receiving and transmitting signals between the femtocell and the mobile device. The femtocell access point can send an indication to the core network via an Iuh interface to a femtocell controller on the core network. The femtocell access point can also forward identifying information about the mobile device to the core network, including but not limited to such information as the IMSI and MSISDN numbers associated with the mobile device.

At 510, location information from the femtocell access point can be obtained. In one embodiment, the location information can be provided by the femtocell access point via the femtocell controller over the Iuh interface. In this embodiment, the location information can be obtained by a GPS receiver on the femtocell access point that provides the latitude and longitude of the femtocell access point. The GPS receiver can continuously provide location information, or can provide new location information if the location of the femtocell access point changes.

In another embodiment, the location information can be collected from a known location of the femtocell access point from a data store in the core network. To collect location information corresponding to the correct femtocell, information identifying the femtocell access point can be received, and that information can be used to the retrieve the on record location of the femtocell access point.

At 520, calculated time differences between the mobile device and macrocells within range of the mobile device can be received. The macrocells can periodically send out signals that can be received by mobile devices in range of the macrocells. The signals can contain code that can identify the macrocell that sent the signal. Each macrocell can have a unique signature, so that the signal can be positively identified as belonging to a specific macrocell. The mobile device can analyze the signals when they are received, and compare the times of receipt. When signals arrive at different times that can indicate that the signals had different distances to travel, and thus the relative distances of the macrocells can be determined. These time differences are the calculated time differences and there can be an calculated time difference for each macrocell within range of mobile device.

The calculated time differences can be collected in the form of an RRC measurement report. The RRC measurement report can include the primary scrambling code of the macrocell, strength of the signal, and the timing measurement. The primary scrambling code can identify the macrocell. Upon determining the identity of macrocell, the location of macrocell can be retrieved from a data store stored in the core network.

At 530, a reference time difference for each of the macrocells can be calculated using the location of the femtocell access point, the location of the macrocells, and the calculated time difference. The reference time differences are a measure of the relative timing differences that different macrocells have with respect to a baseline time. The reference time differences can be used to compensate for the asynchronicities inherent in UMTS and WCDMA networks so that network based locating systems utilizing calculated time differences will yield results that are more accurate.

With the known locations of mobile device and the macrocells, the distance between the macrocells and the mobile device can be determined. Since signals between the macrocells and mobile device travel at a constant speed c, the expected time it takes for a signal from each macrocell to arrive at the mobile device can be determined. The expected time can be compared to the calculated time difference to determine the deviation of the signals from a baseline time. This deviation is the reference time difference, which can compensate for the asynchronous signals from the macrocells. The reference time differences can then be used to locate another mobile device.

Referring now to FIG. 6, illustrated is an example, non-limiting method for locating mobile devices in accordance with the subject disclosure. At 600, a reference time difference can be calculated by comparing location information about the femtocell access point and the macrocells, as well as the calculated time differences. At 610, calculated time differences between the macrocells and another mobile device can be received. At 620 the reference time differences that correspond to the macrocells can be used, as well as the calculated time differences at the other mobile device to solve for a location of the other mobile device. Subtracting the reference time differences from the calculated time differences can yield actual time differences for signals sent between the macrocells and the mobile device. Using the actual time difference with the known locations of macrocells, it can be possible to use the method of multilateration or hyperbolic positioning which uses time difference on arrival (TDOA) equations to solve for the location of mobile device.

Figure 7:
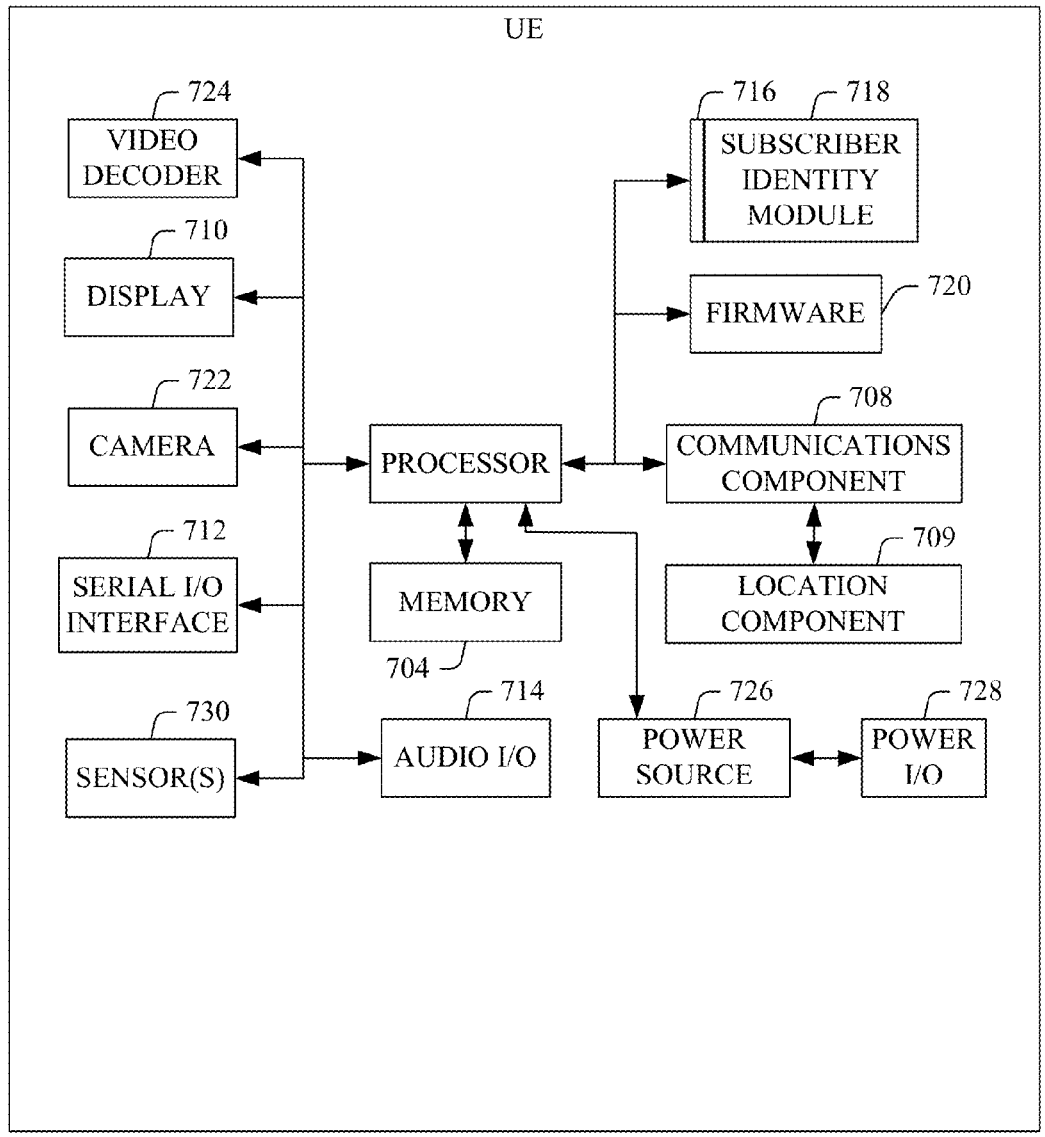
FIG. 7 illustrates a block diagram of a User Equipment (UE) suitable for collecting and reporting calculated time differences in accordance with the subject disclosure.

Referring now to FIG. 7, there is illustrated a block diagram of a UE 700 in accordance with the innovation. The UE 700 can include a processor 702 for controlling all onboard operations and processes. A memory 704 can interface to the processor 702 for storage of data and one or more applications 706 being executed by the processor 702. A communications component 708 can interface to the processor 702 to facilitate wired/wireless communication with external systems (e.g., femtocell and macro cell). The communications component 708 interfaces to a location component 709 (e.g., GPS transceiver) that can facilitate location detection of the UE 700. Note that the location component 709 can also be included as part of the communications component 708.

The UE 700 can include a display 710 for displaying content downloaded and/or for displaying text information related to operating and using the device features. A serial I/O interface 712 is provided in communication with the processor 702 to facilitate serial communication (e.g., USB, and/or IEEE 1394) via a hardwire connection. Audio capabilities are provided with an audio I/O component 714, which can include a speaker for the output of audio signals related to, for example, recorded data or telephony voice data, and a microphone for inputting voice signals for recording and/or telephone conversations. In addition, sensor(s) 730 can be included to detect usage activity of the UE 700 and/or to detect position, motion and/or orientation of the UE 700.

The UE 700 can include a slot interface 716 for accommodating a subscriber identity module (SIM) 718. Firmware 720 is also provided to store and provide to the processor 702 startup and operational data. The UE 700 can also include an image capture component 722 such as a camera and/or a video decoder 724 for decoding encoded multimedia content. The UE 700 can also include a power source 726 in the form of batteries, which interfaces to an external power system or charging equipment via a power I/O component 728. In addition, the UE 700 can be substantially similar to and include functionality associated with mobile devices 104, 202, 302, and 402 described herein.

Figure 8:
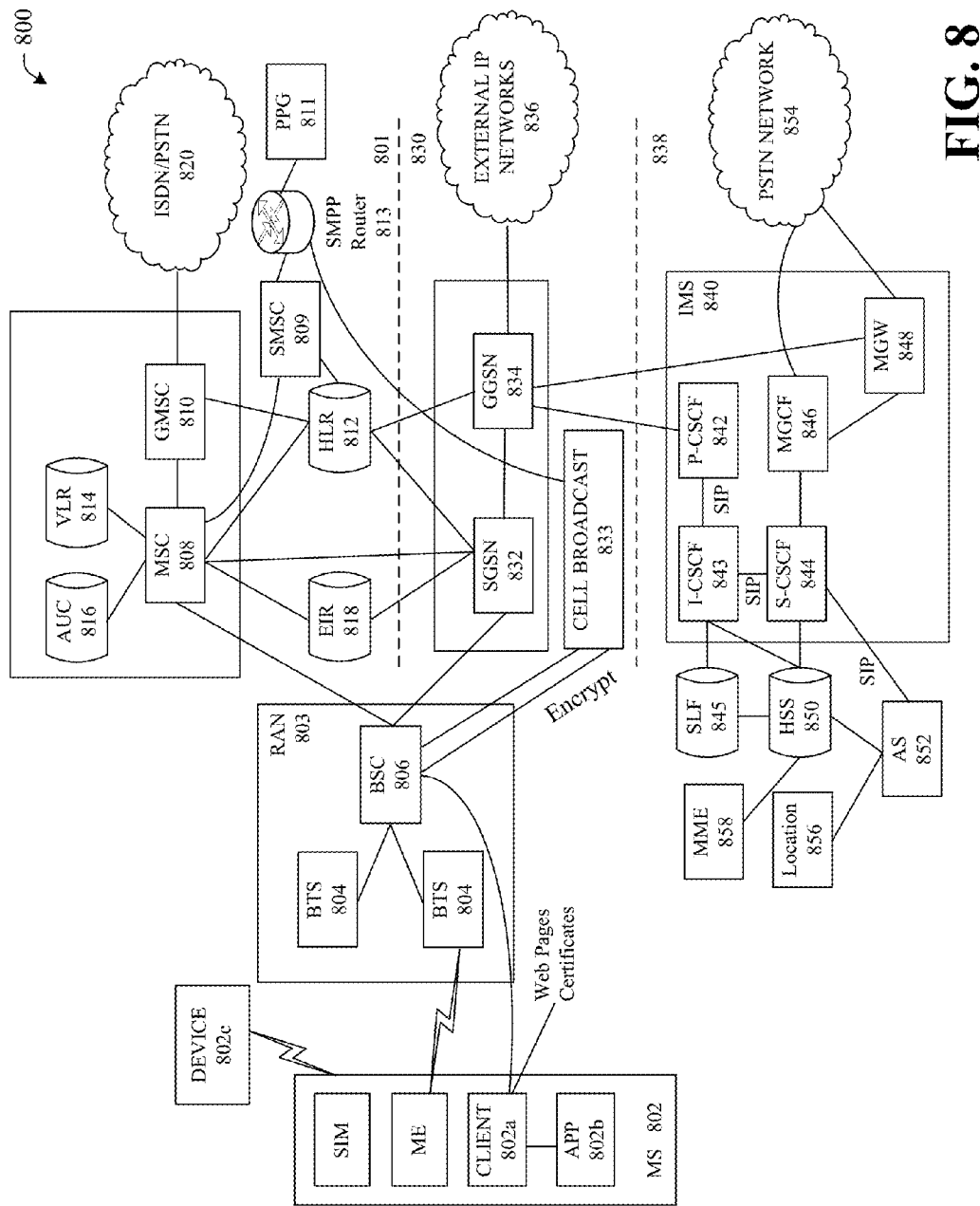
FIG. 8 illustrates a Global System for Mobile Communications (GSM)/General Packet Radio Service (GPRS)/Internet protocol (IP) multimedia network architecture that can employ the disclosed architecture.

Now turning to FIG. 8, such figure depicts an example GSM/GPRS/IP multimedia network architecture 800 that can employ the disclosed communication architecture. In particular, the GSM/GPRS/IP multimedia network architecture 800 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 802 includes an embedded client 802a that receives and processes messages received by the MS 802. The embedded client 802a can be implemented in JAVA or another programming language and is discuss more fully below. It can be appreciated that MS 802 can be substantially similar to mobile devices 104, 202, 302, 402, and UE 700, and can include functionality described with respect to mobile devices 104, 202, 302, and 402 in systems 100-400 and 700.

The embedded client 802a communicates with an application 802b (e.g., application(s) 202) that provides services and/or information to an end user. Additionally or alternately, the MS 802 and a device 802c can be enabled to communicate via a short-range wireless communication link, such as BLUETOOTH®. As one of ordinary skill in the art would recognize, there can be an endless number of devices 802c that use the SIM within the MS 802 to provide services, information, data, audio, video, etc. to end users.

The BTS 804 is physical equipment, such as a radio tower, that enables a radio interface to communicate with the MS 802. Each BTS can serve more than one MS. The BSC 806 manages radio resources, including the BTS. Moreover, the BSC 806 can be substantially similar to macrocells 106, 108, and 110 and etc., disclosed herein. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 816, and an Equipment Identity Register (EIR) 818. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. In other words, the GMSC 810 provides interworking functionality with external networks.

The HLR 812 is a database or component(s) that comprises administrative information regarding each subscriber registered in a corresponding GSM network. The HLR 812 also includes the current location of each MS. The VLR 814 is a database or component(s) that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (e.g., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. In one aspect, the location update is periodically performed to update the database as location-updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations, security functions, and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN. In a GSM/GPRS network, GPRS services and GSM services can be used in parallel. A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 can be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 can also modify an outgoing request according to a set of rules defined by the network operator (for example, address analysis and potential modification).

The I-CSCF 843 forms an entrance to a home network and hides the inner topology of the home network from other networks and provides flexibility for selecting an S-CSCF. The I-CSCF 843 can contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802. The mobility management entity (MME) 858 provides authentication of a user by interacting with the HSS 850 in LTE networks.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with a PSTN network 854 for TDM trunks. In addition, the MGCF 846 communicates with the PSTN network 854 for SS7 links.

Figure 9:
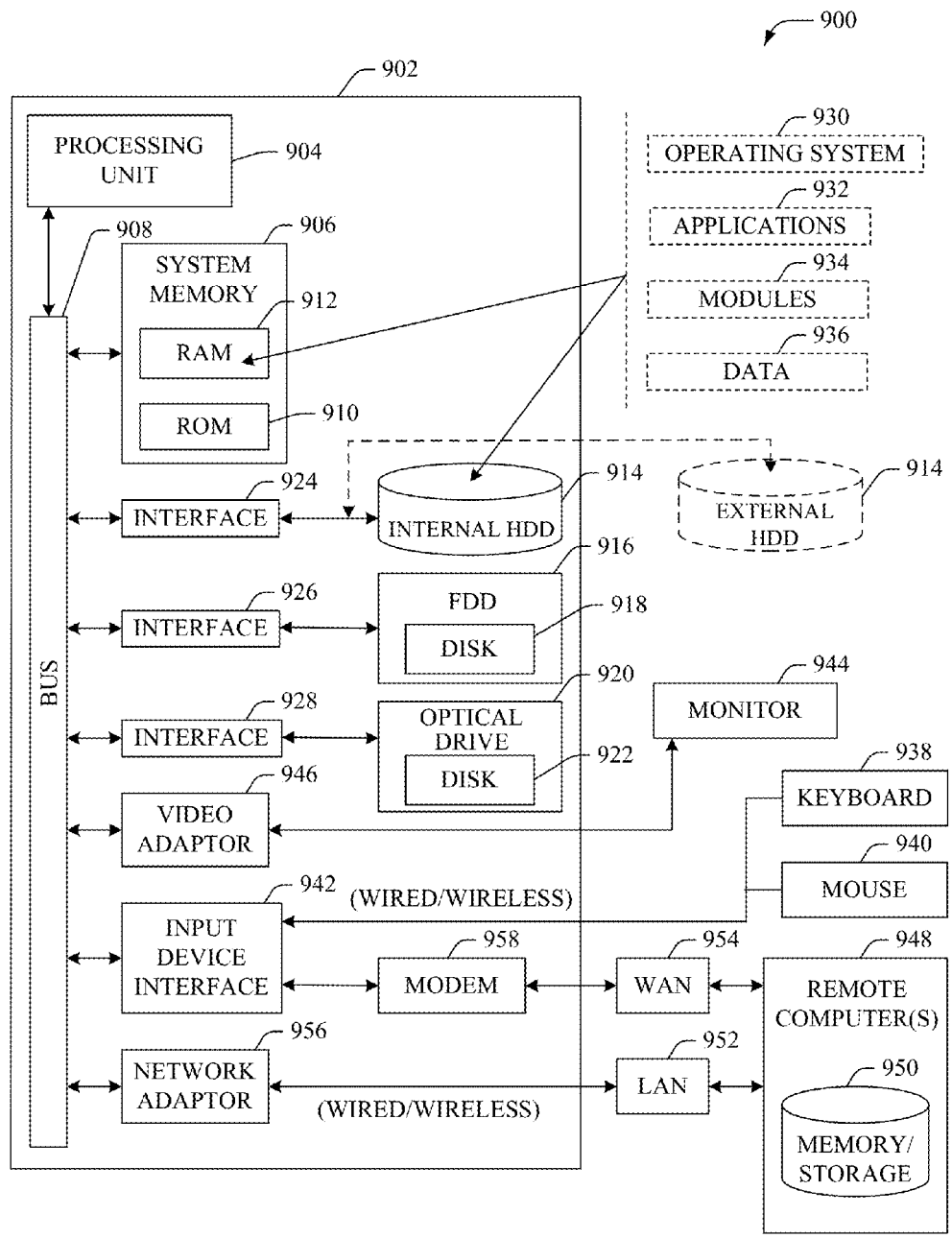
FIG. 9 illustrates a block diagram of a computer operable to execute the disclosed communication architecture.

Referring now to FIG. 9, there is illustrated a block diagram of a computer operable to execute the disclosed communication architecture. In order to provide additional context for various aspects of the subject specification, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Program modules can include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer can include other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and can include many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and offices.

Figure 10:
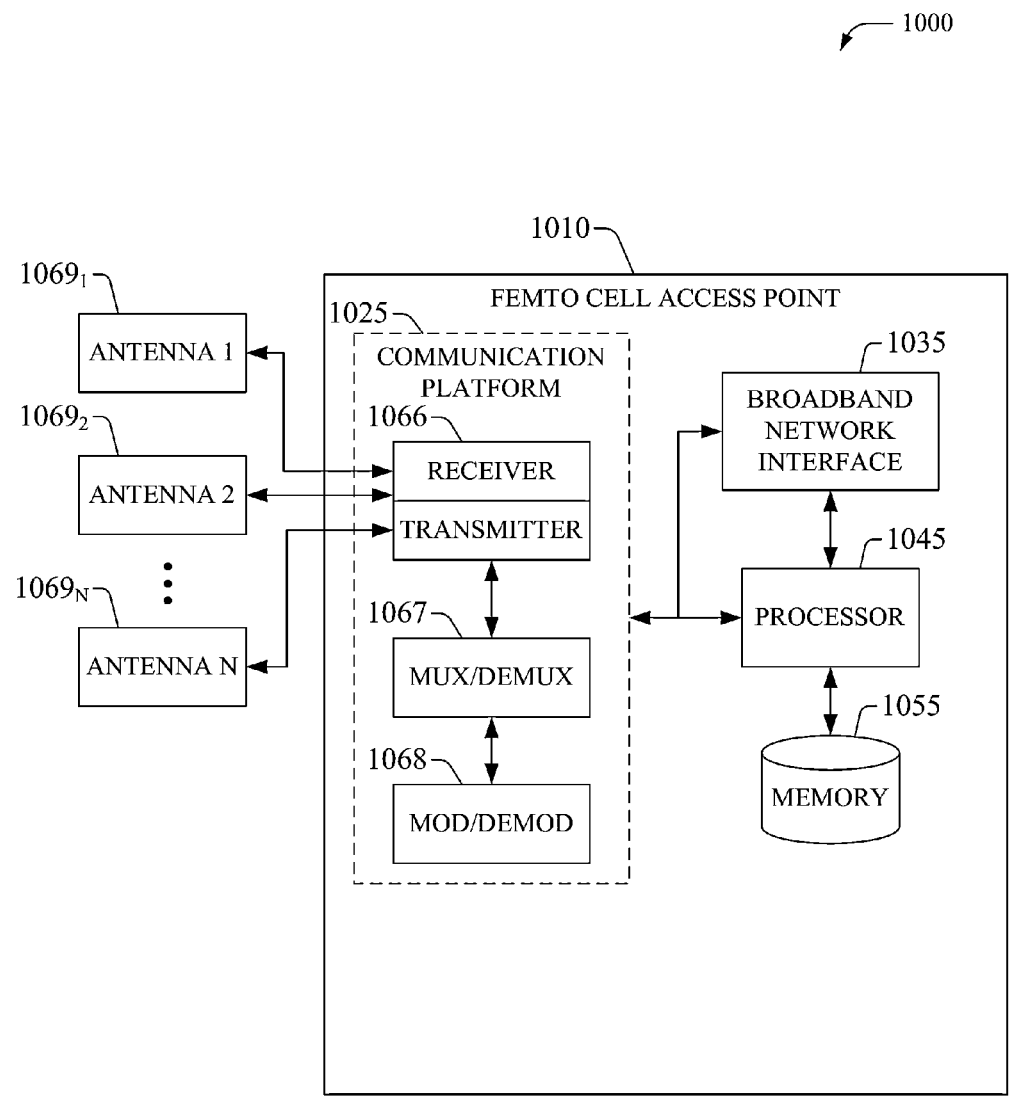
FIG. 10 illustrates an example embodiment of a femtocell access point that can report location information in accordance with the subject disclosure.

With respect to FIG. 10, in example embodiment 1000, femtocell AP 1010 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 includes a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1010 also includes a processor 1045 configured to confer functionality, at least partially, to substantially any electronic component in the femto access point 1010, in accordance with aspects of the subject disclosure. In particular, processor 1045 can facilitate FAP 1010 to implement configuration instructions received through communication platform 1025, which can include storing data in memory 1055. In addition, processor 1045 facilitates FAP 1010 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations (e.g., basement, home office . . . ) covered by FAP; and exploit substantially any other advantages associated with smart-antenna technology. Memory 1055 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; FAP address(es) or geographical indicator(s); access lists (e.g., white lists); license(s) for utilization of add-features for FAP 1010, and so forth. In one example, data store 206 can be implemented in memory 1055.

In embodiment 1000, processor 1045 is coupled to the memory 1055 in order to store and retrieve information necessary to operate and/or confer functionality to communication platform 1025, broadband network interface 1035 (e.g., a broadband modem), and other operational components (e.g., multimode chipset(s), power supply sources, . . . , not shown) that support femto access point 1010.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "interface," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining a timing calibration parameter for a macrocell device based on a variation between a first measured time difference between the macrocell device and a first mobile device and a first projected time difference between the macrocell device and a femtocell access point device within communication range of the first mobile device; and
      determining a location of a second mobile device based on the timing calibration parameter and a second measured time difference between the macrocell device and the second mobile device.

2. The system of claim 1, wherein the operations further comprise:
   receiving location information from the femtocell access point device via an Iuh interface.

3. The system of claim 2, wherein the receiving the location information from the femtocell access point device further comprises receiving a timestamp that corresponds to the location information.

4. The system of claim 1, wherein the determining the location of the second mobile device is based on respective timing calibration parameters and measured time differences between a set of macrocell devices, comprising the macrocell device, and the second mobile device.

5. The system of claim 1, wherein the operations further comprise:
   determining the variation between the first projected time difference and the measured time difference based on report data representing a radio resource control measurement report.

6. The system of claim 5, wherein the report data comprises a primary scrambling code that identifies the macrocell device and an indication of a signal strength related to the macrocell device.

7. The system of claim 5, wherein the determining the timing calibration parameter for the macrocell device comprises:
   determining the timing calibration parameter for the macrocell device based on respective report data representing radio resource control measurement reports associated with a set of macrocell devices comprising the macrocell device.

8. The system of claim 1, wherein the operations further comprise:
   receiving measured time differences, comprising the first measured time difference or the second measured time difference, over a period of time.

9. The system of claim 8, wherein the operations further comprise:
   redetermining the first measured time difference based on an average of the measured time differences.

10. The system of claim 1, wherein the operations further comprise:
    initiating reception of the first measured time difference in response to determining that the first mobile device is within the communication range of the macrocell device.

11. A method, comprising:
    receiving, by a system comprising a processor, report information representing a radio resource control measurement report from a first mobile device that comprises timing measurements between macrocell devices and the first mobile device;
    determining, by the system, respective timing calibration parameters for the macrocell devices based on a variation between the timing measurements and projected time differences between the macrocell devices and a femtocell access point device determined to be within range of the first mobile device; and
    determining, by the system, a location of a second mobile device based on the timing calibration parameters and measured time differences between the macrocell devices and the second mobile device.

12. The method of claim 11, further comprising:
    obtaining, by the system, a location associated with the femtocell access point device from an Iuh interface.

13. The method of claim 11, further comprising:
    obtaining, by the system, a location associated with the femtocell access point device via a femtocell device controller.

14. The method of claim 12, wherein the obtaining the location associated with the femtocell access point device further comprises obtaining a timestamp that corresponds to the location information.

15. The method of claim 11, wherein the receiving the report information comprises receiving first report information at a first time representing a first radio resource control measurement report and receiving second report information at a second time representing a second radio resource control measurement report.

16. The method of claim 15, further comprising:
    averaging, by the system, respective timing measurements of the first radio resource control measurement report and the second radio resource control measurement report; and
    redetermining, by the system, the timing calibration parameters based on a result of the averaging.

17. The method of claim 11, wherein the receiving the report information further comprises receiving code data representing a primary scrambling code that identifies the macrocell device of the macrocell devices and an indication of a signal strength related to the macrocell device.

18. A computer-readable storage device, comprising executable instructions that, in response to execution, cause a device comprising a processor to perform operations, comprising:

receiving a first set of calculated time differences between a first mobile device and macrocell devices within a defined range of the first mobile device;

determining reference time differences for the macrocell devices based on location information received from a femtocell device and the calculated time differences, wherein the reference time differences are respective timing offsets for the macrocell devices relative to a baseline time; and determining a location of a second mobile device as a function of the reference time differences and a second set of calculated time differences between the second mobile device and the macrocell devices.

19. The computer-readable storage device of claim 18, wherein the determining the reference time differences for the macrocell devices further comprises comparing the location information from the femtocell device and locations of the macrocell devices.

20. The computer-readable storage device of claim 18, wherein the receiving the first set of calculated time differences between the first mobile device and the macrocell devices further comprises receiving calculated time differences of the set of calculated time differences at different times of a period of time.

* * * * *